(12) United States Patent
McNamara et al.

(10) Patent No.: US 8,391,893 B2
(45) Date of Patent: Mar. 5, 2013

(54) DEVICES, SYSTEMS AND METHODS FOR SMS-BASED LOCATION QUERYING

(75) Inventors: Justin Michael Anthony McNamara, Atlanta, GA (US); John Potts Davis, III, Marietta, GA (US); Jay Daryl Rector, Loganville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 454 days.

(21) Appl. No.: 12/636,029

(22) Filed: Dec. 11, 2009

(65) Prior Publication Data

US 2011/0143774 A1    Jun. 16, 2011

(51) Int. Cl.
*H04W 24/00*    (2009.01)
(52) U.S. Cl. .......... 455/456.2; 455/466; 455/550.1; 455/456.1; 455/457; 455/456.5; 455/456.6
(58) Field of Classification Search ........... 455/456.2, 455/466, 550.1, 456.1, 457, 456.5, 456.6
See application file for complete search history.

(56) References Cited

U.S. PATENT DOCUMENTS

| | | | |
|---|---|---|---|
| 2004/0131081 A1* | 7/2004 | Bhatia et al. | 370/466 |
| 2006/0030339 A1* | 2/2006 | Zhovnirovsky et al. | 455/456.6 |
| 2008/0113671 A1* | 5/2008 | Ghozati et al. | 455/456.1 |
| 2008/0268870 A1* | 10/2008 | Houri | 455/456.1 |
| 2010/0156713 A1* | 6/2010 | Harper | 342/357.09 |

\* cited by examiner

*Primary Examiner* — Kamran Afshar
*Assistant Examiner* — Khalid Shaheed
(74) *Attorney, Agent, or Firm* — Hope Baldauff Hartman, LLC

(57) ABSTRACT

The disclosure provides devices, systems, and methods for determining a position of a mobile communication device by communicating with the device via a Short Messaging System (SMS). A location query is submitted to an SMS center, which formats a first SMS message for delivery to the device. The first SMS message is delivered to a designated SMS port on the device. A location logic on the device receives the SMS via the SMS port, extracts the location query, and attempts to calculate a location from received satellite signals. The calculated location is submitted back to the SMS server, either to be forwarded to the location server, or to a network element or device that submitted the location query to the SMS center in the first place. Assistance data may additionally be delivered to the mobile communication device via the SMS port.

20 Claims, 6 Drawing Sheets

DEVICES, SYSTEMS AND METHODS FOR SMS-BASED LOCATION QUERYING

BACKGROUND OF THE INVENTION

1. Field of the Invention

The present invention relates to mobile communication networks. More particularly, the present invention relates to providing a GPS location for a mobile communication device.

2. Background of the Invention

Mobile communication devices are becoming increasingly ubiquitous. Cellular transceivers can be found in several portable and fixed devices that can further communicate over other types of networks. Moreover, increasing numbers of mobile communication devices are being equipped with Global Positioning System (GPS) receivers to enable a device to determine a geographical position or location. The location can be determined solely by the device (standalone GPS) or by using assistance data provided by the network (assisted or A-GPS). This has paved the path for introducing several location-based services.

Today, location determination over a mobile network can be performed using generally two different methods of communication. Control Plane A-GPS uses traditional call signaling over the Radio Access Network (RAN) as the bearer path for all A-GPS messaging between the mobile device and the network. This typically includes a request for and a return of the location of the mobile communication device, as well as any GPS assistance data that is exchanged. Several problems exist with control plane A-GPS, such as excessive network radio resource consumption, requirement of several data conversions and protocols, etc.

More recently, the User Plane has been employed for location determination. User Plane A-GPS uses a wireless data connection as the bearer path for all A-GPS messaging between the mobile device and the network. Again, this typically includes the request for and the return of the location of the device, as well as any GPS assistance data that is exchanged. Advantages to this system are that the data connection is ideal for a back-and-forth exchange of different types of location and assistance information.

However, not all mobile communication devices on the market today are able to communicate across the user plane. Particularly, with respect to proprietary programming on certain devices, based on a contractual deal between a device manufacturer and a network operator, some devices are simply not programmed with the ability to receive assistance data via a Secure User Plane Location (SUPL).

Therefore, what is needed is an alternative technique for providing a location of a mobile communication device.

SUMMARY OF THE INVENTION

The present invention addresses the above-identified problems by providing devices, systems, and methods for determining a position of a mobile communication device by communicating with the device via a Short Messaging System (SMS). A location server on the network receives a query for a location of the device, and attempts to connect to the device via the user plane. If the user plane query is unsuccessful, or if the location server determines by referring to a database that the particular device is unable to communicate across the user plane, then an SMS mechanism is invoked. The location query is submitted to an SMS center, which formats a first SMS message for delivery to the device. The first SMS message is delivered to a designated SMS port on the device. A location logic on the device receives the SMS via the SMS port, extracts the location query, and attempts to calculate a location from received satellite signals. The calculated location is submitted back to the SMS server, either to be forwarded to the location server, or to a network element or device that generated the location query in the first place. Assistance data may additionally be delivered to the mobile communication device via the SMS port.

In one exemplary embodiment, the present invention is a mobile communication device on a network, the mobile communication device including a processor, a memory in communication with the processor, a transceiver in communication with the processor, a GPS receiver in communication with the processor, and a location logic on the memory. The location logic receives a first short message service (SMS) message from the network via the transceiver, extracts a location query from the first SMS message, retrieves a GPS signal from a GPS satellite, calculates a location for the mobile communication device, and transmits the location to the network via a second SMS message.

In another exemplary embodiment, the present invention is a system for determining a location of a mobile communication device on a network, the system including a mobile communication device having a GPS receiver, an SMS center in communication with the mobile communication device across the network, a location server in communication with the SMS center, and a GPS satellite in communication with the GPS receiver. A location logic on the mobile communication device receives a first SMS message from the SMS center at a specified SMS port on the mobile communication device, extracts a location query from the first SMS message, retrieves a GPS signal from the GPS satellite, calculates a location for the mobile communication device, and transmits the location to the network via a second SMS message In yet another embodiment, the present invention is a method for determining a location of a mobile communication device on a network, the method including receiving a first Short Message Service (SMS) message from the network, extracting a location query from the first SMS message, retrieving a GPS signal from a GPS satellite, calculating a location for the mobile communication device, and transmitting the location to the network via a second SMS message.

DETAILED DESCRIPTION OF THE INVENTION

Figure 1:
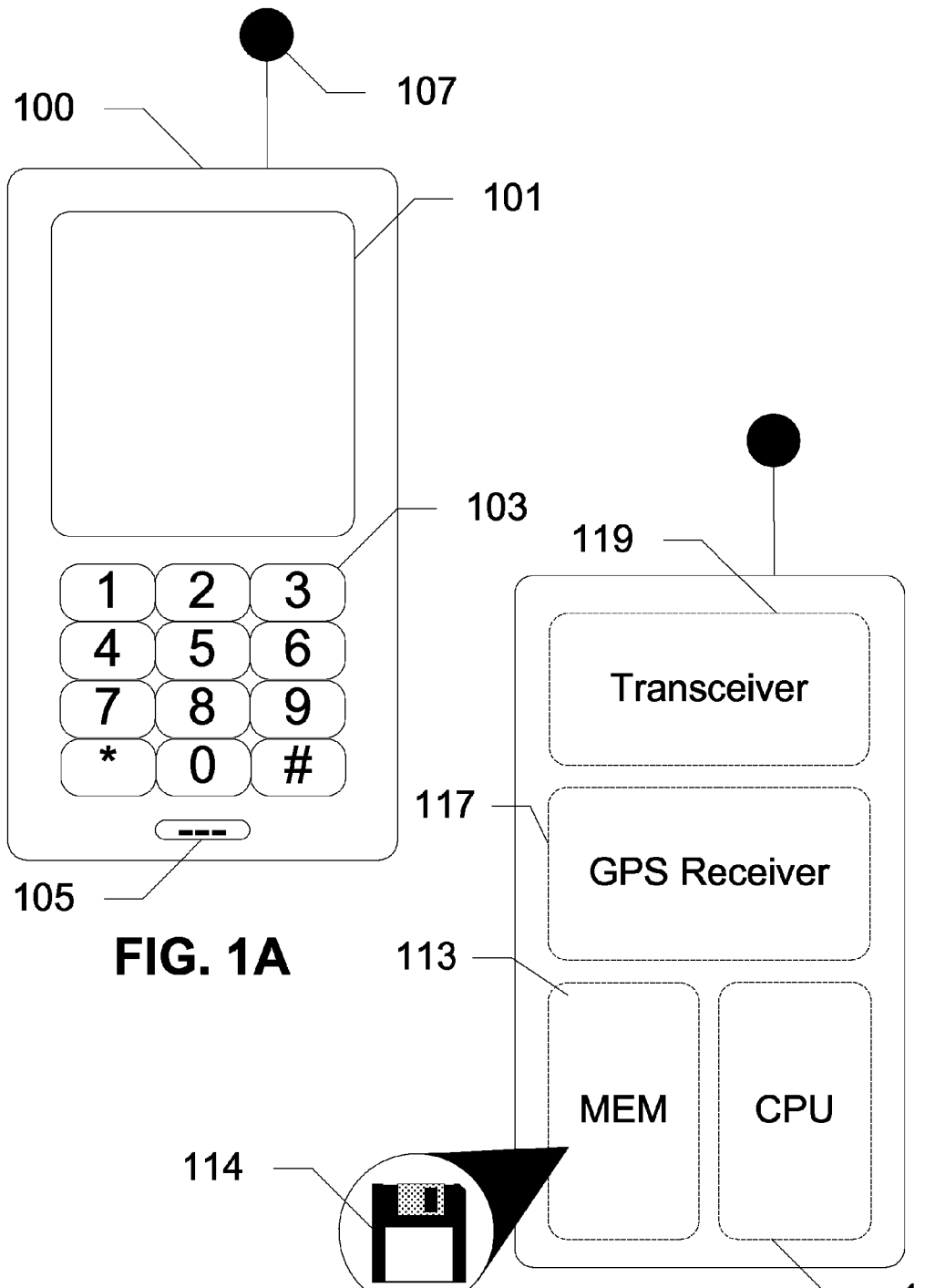
FIGS. 1A and 1B show a mobile communication device with a GPS receiver and location logic, according to an exemplary embodiment of the present invention.

The following detailed description and figures disclose devices, systems, and methods for determining a position of a mobile communication device by communicating with the device via a Short Messaging System (SMS). A location server on the network receives a query for a location of the device, and attempts to connect to the device via the user plane. If the user-plane query is unsuccessful, or if the location server determines by referring to a database that the particular device is unable to communicate across the user plane, then an SMS mechanism is invoked. The location query is submitted to an SMS center, which formats a first SMS message for delivery to the device. The first SMS message is delivered to a designated SMS port on the device. A location logic on the device receives the SMS via the SMS port, extracts the location query, and attempts to calculate a location from received GPS satellite signals. The calculated location is submitted back to the SMS server, either to be forwarded to the location server, or to a network element or device that submitted the location query to the SMS center in the first place. Assistance data may additionally be delivered to the mobile communication device via the SMS port.

"Mobile communication device", as used herein and throughout this disclosure, refers to any electronic device capable of wirelessly sending and receiving data. A mobile communication device may have a processor, a memory, a transceiver, an input, and an output. Examples of such devices include cellular telephones, personal digital assistants (PDAs), portable computers, etc. In one embodiment, a mobile communication device is a handheld GPS receiver. Examples of processors are computer processors (processing units), microprocessors, digital signal processors, controllers and microcontrollers, etc. Examples of device memories include RAM (random access memory), flash memories, ROMS (read-only memories), EPROMS (erasable programmable read-only memories), and EEPROMS (electrically erasable programmable read-only memories). The memory stores applications, software, or logic.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile communication devices communicate with each other and with other elements via a network, for instance, a wireless network, or a wireline network. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include cellular, GPRS, Wi-Fi, BLUETOOTH® networks, etc., with communication being enabled by hardware elements called "transceivers." Some mobile communication devices may have more than one transceiver, capable of communicating over different networks. For example, a cellular telephone can include a GPRS transceiver for communicating with a cellular base station, a Wi-Fi transceiver for communicating with a Wi-Fi network, and a GPS transceiver (GPS receiver) for receiving a signal from a positioning satellite. A network typically includes a plurality of elements that host logic for performing tasks on the network. In modern packet-based wide-area networks, servers may be placed at several logical points on the network. Servers may further be in communication with databases and can enable communication devices to access the contents of a database. A server can span several network elements, including other servers in the cellular network. Network elements also include third-party servers, and other mobile communication devices that communicate with the aforementioned mobile communication device across the network.

A mobile communication device having a GPS receiver can also use the A-GPS system, whereby the network provides the device with assistance data to improve the ability to locate and receive signals from GPS satellites. Assistance data includes location information for the Base Transceiver Station (BTS) that provides the device with access to the network, as well as Public Land Mobile Network (PLMN) information for the network, GPS satellite ephemeris data, GPS satellite almanac data, etc.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A and 1B show a mobile communication device with a GPS receiver and location logic, according to an exemplary embodiment of the present invention.

FIG. 1A shows the external components of the mobile communication device 100, according to an exemplary embodiment of the present invention. Mobile communication device 100 includes display 101, keypad 103, microphone 105, and antenna 107. Display 101 is a liquid-crystal display (LCD) which gives a user of mobile communication device 100 a visual output. Keypad 103 is an alphanumeric arrangement of buttons which gives the user tactile input. Microphone 105 gives the user audio input so that the user may talk to the user of another mobile communication device, provide voice command input, or record sound.

FIG. 1B shows the internal components of mobile communication device 100, according to an exemplary embodiment of the present invention. Mobile communication device 100 includes processor (CPU) 111, memory 113 having location logic 114 and approximate location database, GPS chip 117, and transceiver 119. Processor 111 is preferably a mobile processor and performs calculations according to logic stored on memory 113. Memory 113 is a computer readable medium known as random access memory (RAM) which stores logic, user information, contact information, etc. Transceiver 119 is a cellular radio frequency (RF) transmitter and receiver which allows mobile communication device 100 to communicate wirelessly across a network. This enables mobile communication device 100 to share information other electronic devices, issue and execute commands, etc. Location logic 114 controls GPS receiver 117, and receives instructions from the network via transceiver 119.

Location logic 114 additionally processes incoming SMS messages received via transceiver 119. For instance, location logic 114 is programmed to monitor or "listen" to a specific SMS port on mobile communication device 100. Any incoming SMS message that is targeted to the particular port is identified by location logic 114 as containing a location query. The location query is extracted from the SMS message, and the GPS receiver 117 is invoked to receive GPS signals.

Based on the received GPS signals from one or more GPS satellites, location logic 114 can calculate a position or location of mobile communication device 100. The location can be calculated solely by location logic 114, or location logic 114 can transmit a request for assistance. For devices that cannot communicate over the user plane, location logic 114 can submit the assistance request via another SMS message, which is received by an SMS server that forwards the assistance request to one or more network elements that provide assistance data. The assistance data can be transmitted back to mobile communication device 100, preferably via the same SMS port so that location logic 114 can retrieve and extract the assistance data to calculate the location. For instance, location logic 114 uses the assistance data to instruct GPS receiver 117 as to which GPS satellites to receive signals from.

Once an exact location is determined from signals from a set of satellites, the location is reported back to the network via another SMS message. The location can include coordinates of mobile communication device 100, and any additional descriptive information. The SMS message containing the location can be transmitted to the SMS center or directed to a location server by using an assigned short code. The location is used by the network for several purposes.

In further embodiments the mobile communication device is a substantially simpler device, such as a standalone GPS or a GPS-enabled weather-reporting unit coupled to a multi-function device. In these embodiments the mobile communication device may not have a microphone or display. There may be limited applications on the memory, in many cases only one. These mobile communication devices receive location queries in the form of SMS from the network, extract the location query, detect a location using GPS signals, and transmit the location back to the network. In the case of a standalone weather communicator, a speaker can be used to audibly communicate the weather to the user periodically, or in the event of a warning. For instance, a user of a mobile communication device can be alerted anytime a network entity queries a location of the mobile communication device.

Figure 2:
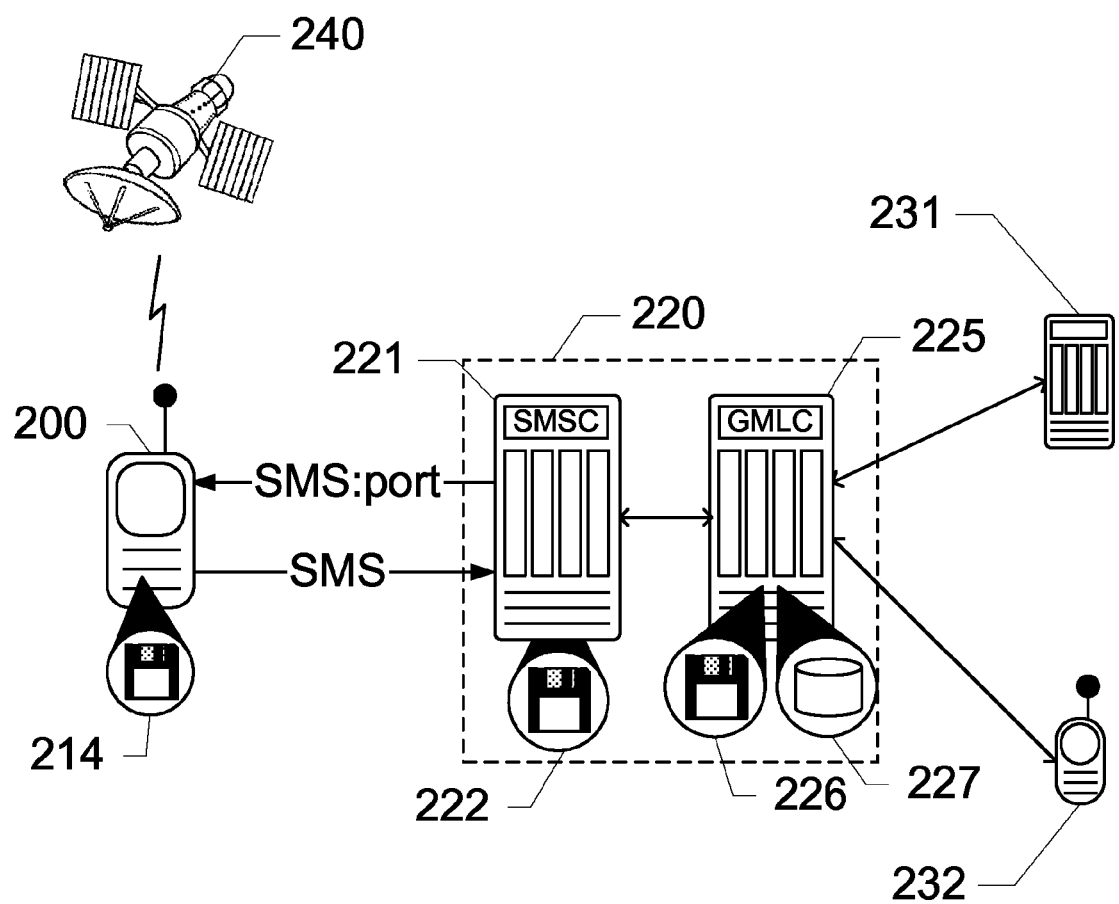
FIG. 2 shows a system for determining a location of a mobile communication device, according to an exemplary embodiment of the present invention.

The SMS center, location server, and other network elements disclosed above can be part of system for determining a location of a mobile communication device. FIG. 2 shows such a system for determining a location of a mobile communication device, according to an exemplary embodiment of the present invention. A mobile communication device 200, including a location logic 214, is in communication with a network 220. A Short Message Service (SMS) Center 221 resides on the network, and includes SMS logic 222. SMS Center 221 is further in communication with a location server 225, for instance, a Gateway Mobile Location Center (GMLC), which includes a server logic 226, and a SUPL-device database 227. Other network elements communicate with network 220, for instance, third-party server 231, and third-party device 232. Further, mobile communication device 200 is in communication with GPS satellite 240 via a GPS transceiver included in the device 200. Other network elements are not shown but will be apparent to one skilled in the art, such as a Base Transceiver Station (BTS), Home Location Register (HLR), Mobile Switching Center (MSC), etc.

Third-party network element 231 or 232 submits a location query to network 220 to determine the location of mobile communication device 200. For instance, a third-party server requires a location for mobile communication device 200 because it is hosting an application that provides a location-based service to a user of mobile communication device 200. Or, third-party server 231 is part of a Public Safety Answering Point (PSAP) in an E911 system, whereby third-party server 231 needs to determine a location for a caller using mobile communication device 200. Third-party device 232 can be any other mobile communication device that submits a location query, for instance a friend or family member of the user of mobile communication device 200, a remote user, etc. In either case, third-party network elements 231-232 submit a location query to a location server using any means known in the art, wherein the location query traverses several existing network elements not shown but apparent to one of ordinary skill in the art.

Upon receipt of a location query, GMLC 225 initially determines whether or not the target mobile communication device 200 is able to communicate across the user plane. This determination can be performed by referring to SUPL device database 227 that contains records for a plurality of mobile communication devices. For instance, specific makes and models of mobile communication devices, such as iPhones, are listed as being not compliant with a Secure User Plane Location (SUPL) system. If the target mobile communication device, such as mobile communication device 200, is not listed in such a database, or is listed as being SUPL-compliant, then GMLC 225 simply transmits the location query to device 200, and establishes communication between mobile communication device 200 and a SUPL server as is known in the art. Furthermore, other location servers such as a Server Mobile Location Center (SMLC), etc. can be invoked for a location determination.

If, however, it is determined that mobile communication device 200 is not able to communicate across the user plane, then an SMS mechanism is invoked. GMLC 225 forwards the location query to SMS center (SMSC) 221. The location query can be forwarded along with information specific to mobile communication device 200, such as a specific SMS port to direct the location query to. Alternatively, the SMS port can be specified by an operator of the network universally, in which case SMS logic 222 on SMSC 221 is aware of the SMS port used for location queries. In either case, SMS logic 222 generates an SMS message including the location query, and transmits the SMS message to the specified port on mobile communication device 200. The SMS message can be directed to specific ports in one of several mechanisms known in the art.

Location logic 214 on mobile communication device 200 receives the SMS message and determines that the SMS message contains a location query. This is achieved by listening for SMS messages that are directed to the particular port or ports allocated for location queries. The allocation can be made by logic 214, or by an operator of network 220. Other incoming SMS messages are processed by other logic units, whereas incoming SMS messages directed to the specified port are parsed by location logic 214. Location logic 214 extracts the location query from the SMS message, and invokes a GPS receiver on mobile communication device 200. The GPS receiver detects signals from GPS satellite 240. Multiple signals from more than one GPS satellite are used by location logic 214 to determine a position of mobile communication device 200, as is known in the art. When a location is calculated, location logic 214 generates a response SMS message that includes the location, and transmits the message to SMSC 221. The response SMS message can be transmitted to a specific SMS code, so that SMS logic 222 recognizes the SMS message as containing a location.

Upon receiving the SMS message with the location, SMS logic 222 extracts the location from the SMS message and transmits the location to GMLC 225. GMLC 225 forwards the location to the querying device, such as third-party network element 231 or 232, possibly with other information about mobile communication device 200. This other information may include presence information, past locations, etc. The location information can be used by devices 231-232 in several ways. For instance, third-party server 231 hosts applications that provide location-based services such as a weather report, local business information, mapping, directions, etc.

Alternatively, location logic 214 includes a mechanism to verify that one of network elements 231 and 232 has permission to access the location for mobile communication device 200. This can be performed by referring to a database stored locally or on the network. GMLC 225 can also perform a permissions check, and deny a location query from an unauthorized network element based on security settings provided by the network operator or the user of mobile communication device 200. Alternatively, location logic 214 has already calculated a location, and therefore does not need to receive a GPS signal in direct response to the SMS location query. Alternatively, location logic 214 uses assistance data to calculate the location of mobile communication device 200. This is performed by transmitting an SMS message including an assistance request. The assistance request can include the cell ID, LAC, MNC, and MCC of the BTS providing access to the network, as well as a time of day (ToD). The SMSC communicates the assistance request to network elements that provide assistance data, such as GMLC, or a SUPL server. Received assistance data includes an approximate location of the mobile communication device, such as the coordinates of the BTS, and ephemeris data for any satellites that are ideal for providing a GPS signal, such as GPS satellite 240. A GPS almanac is used to determine GPS satellites with which to communicate. The GPS almanac and ephemeris data includes an approximate location of each GPS satellite at a certain time with respect to the approximate location of the mobile communication device. The information may be periodically updated from the network. The almanac is valid for approximately 180 days, and is updated and stored on the mobile communication device as needed. The mobile communication device correlates the ephemeris data and the approximate location with the almanac, and determines a set of satellites from which to receive GPS signals. Based upon the received GPS signals, an exact location of the mobile communication device is determined.

Figure 3:
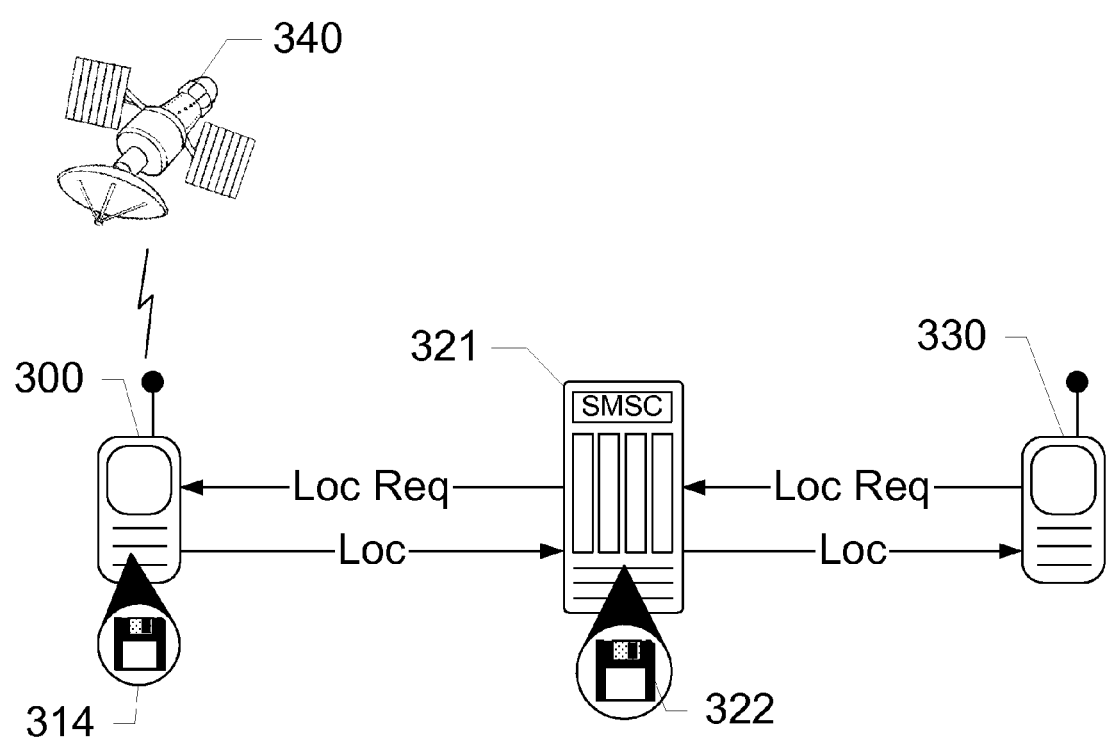
FIG. 3 shows another system for determining a location of a mobile communication device, according to an exemplary embodiment of the present invention.

FIG. 3 shows another system for determining a location of a mobile communication device, according to an exemplary embodiment of the present invention. Mobile communication device 300 is in communication with SMSC 321 across a network, as described above. Third-party device 330 is also in communication with SMSC 321 via network elements that are not shown but will be evident to one skilled in the art. In this embodiment, third-party device 330 submits a location query to SMSC 321. The location query is transmitted via an SMS message, and can be directed to either the telephone number/unique identifier for mobile communication device 300, or may use an SMS code that is pre-programmed and made known to a user of device 330. SMS logic 322 on SMSC 321 receives the location query, and determines a port on mobile communication device 300 to forward the location query. This determination can be made by correlating the telephone number/unique identifier of mobile communication device 300 with a corresponding port or set of ports stored in a database. Alternatively, the SMS code used by device 330 can be an indicator that the incoming SMS message is a location query. SMS logic 322 then determines an appropriate port to forward the location query to, based on the SMS code.

Other means for directing a location query to an SMS port will be evident to one skilled in the art in light of the present disclosure. For instance, The J2ME Wireless Messaging API (WMA) specifies a standard set of APIs that J2ME applications running on SMS-enabled devices can use to communicate with network peers via the SMS protocol. A feature of the WMA is that it allows J2ME devices to run SMS-based server applications that automatically process and respond to incoming messages in the J2ME application. Server addresses can additionally be identified by telephone numbers. For instance, the URL sms://+18005555555:1234 specifies a connection to send SMS messages to port number 1234 at the telephone number 1-800-555-5555. The URL sms://:1234 specifies a server connection to receive messages on port 1234. If an SMS message is sent to a telephone number without a port number, it is interpreted as an inbox message and is handled by the receiving device's messaging logic as an inbox message. A WMA server connection will not process such inbox messages. WMA peers communicate with each through predefined private SMS ports.

Mobile communication device 300 receives the SMS message containing the location query at the port specified by the SMSC 321. Location logic 314 is on the lookout for SMS messages directed to the specified port, and is able to parse the incoming SMS message in order to extract the location query. In response to the query, location logic 314 directs the GPS receiver on mobile communication device 300 to receive GPS signals from GPS satellite 340. A plurality of signals from a plurality of GPS satellites may be used in determining a location for mobile communication device 300. The retrieved location is then submitted back to the SMSC 321 via an SMS message directed to a specified SMS code. The SMS code allows SMS logic 322 to determine that the response SMS is a location provided by mobile communication device 300. Consequently, SMS logic 322 forwards the location to the entity querying the location, in this case, device 330.

Alternatively, location logic 314 can prompt a user of mobile communication device 300 that device 330 is querying a location. A permission can then be granted or denied. Alternatively, a database of permissions can be stored on mobile communication device 300, wherein location logic 314 automatically provides or refuses to provide the location. Alternatively, to calculate a location, location logic 300 can transmit another SMS message to the network to request GPS assistance data. The assistance data request can include a Cell ID, PLMN information, and a time of day. One or more location servers on the network receive the assistance request from SMSC 321, and provide assistance data including an approximate location of mobile communication device 300 and ephemeris data for satellites 340 that are ideal to receive GPS signals. Ideal satellites 340 are selected based on the approximate location of mobile communication device 300 and the time of day. The assistance data can be transmitted to mobile communication device 300 in the form of another SMS message delivered to the specified SMS port on mobile communication device 300.

Figure 4:
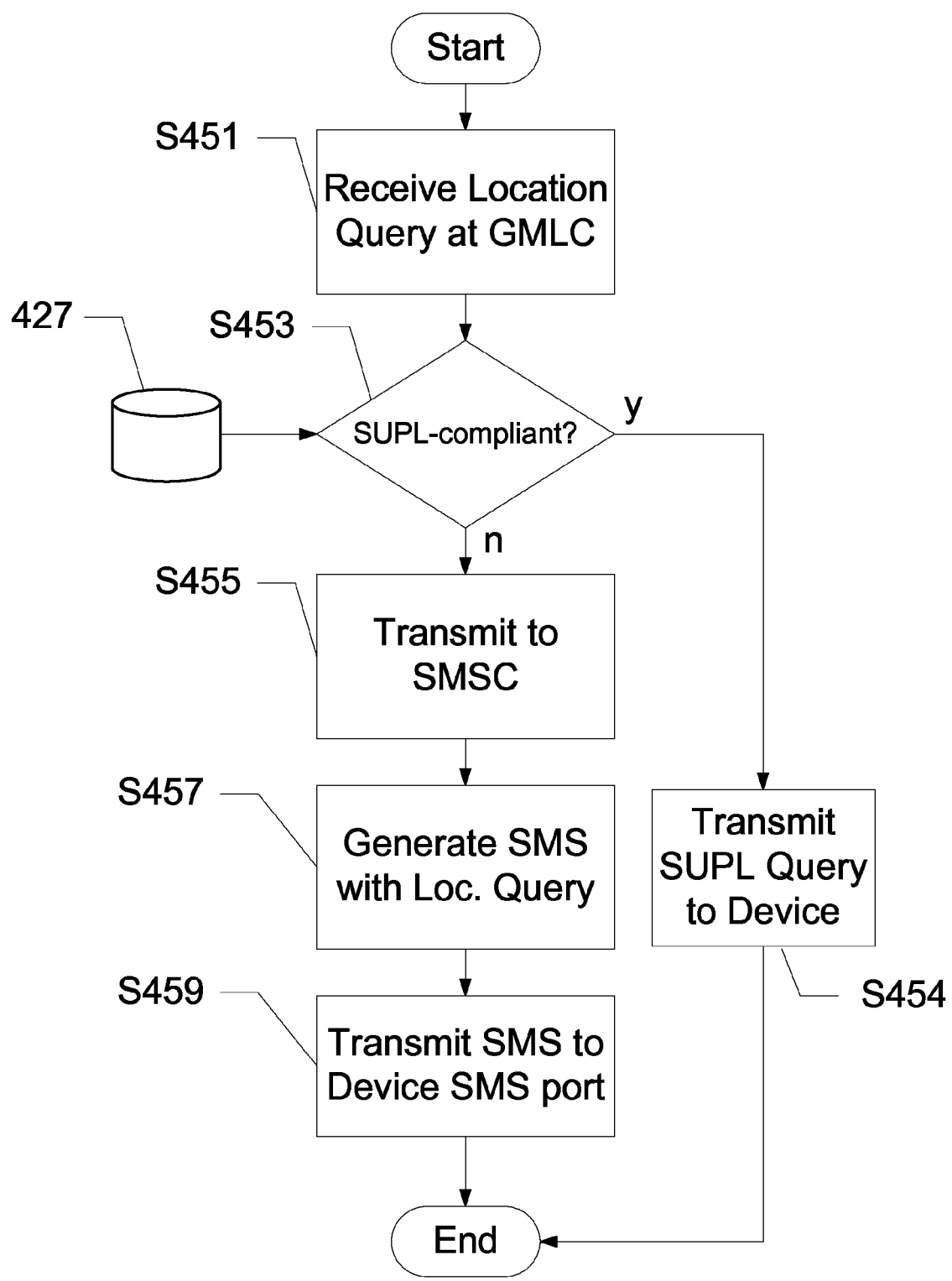
FIG. 4 shows a method for transmitting a location query to a mobile communication device, according to an exemplary embodiment of the present invention.

FIG. 4 shows a method for transmitting a location query to a mobile communication device, according to an exemplary embodiment of the present invention. A location query is received by a GMLC from a network element S451. The location query includes an identifier/address of the target mobile communication device as well as information about the requesting network element. The GMLC determines whether or not the target mobile communication device is SUPL-compliant S453. This involves referring to a SUPL-device database 427. If it is determined that the mobile communication device can communicate over the user plane, then a standard SUPL query is transmitted to the device S454. However, if the mobile communication device is not SUPL-compliant, then the GMLC transmits the location query to an SMSC S455. The SMSC generates an SMS message including the location query as well as identifying information for the original sender S457. The SMS message including the location query is transmitted to a specified port on the mobile communication device S459.

Figure 5:
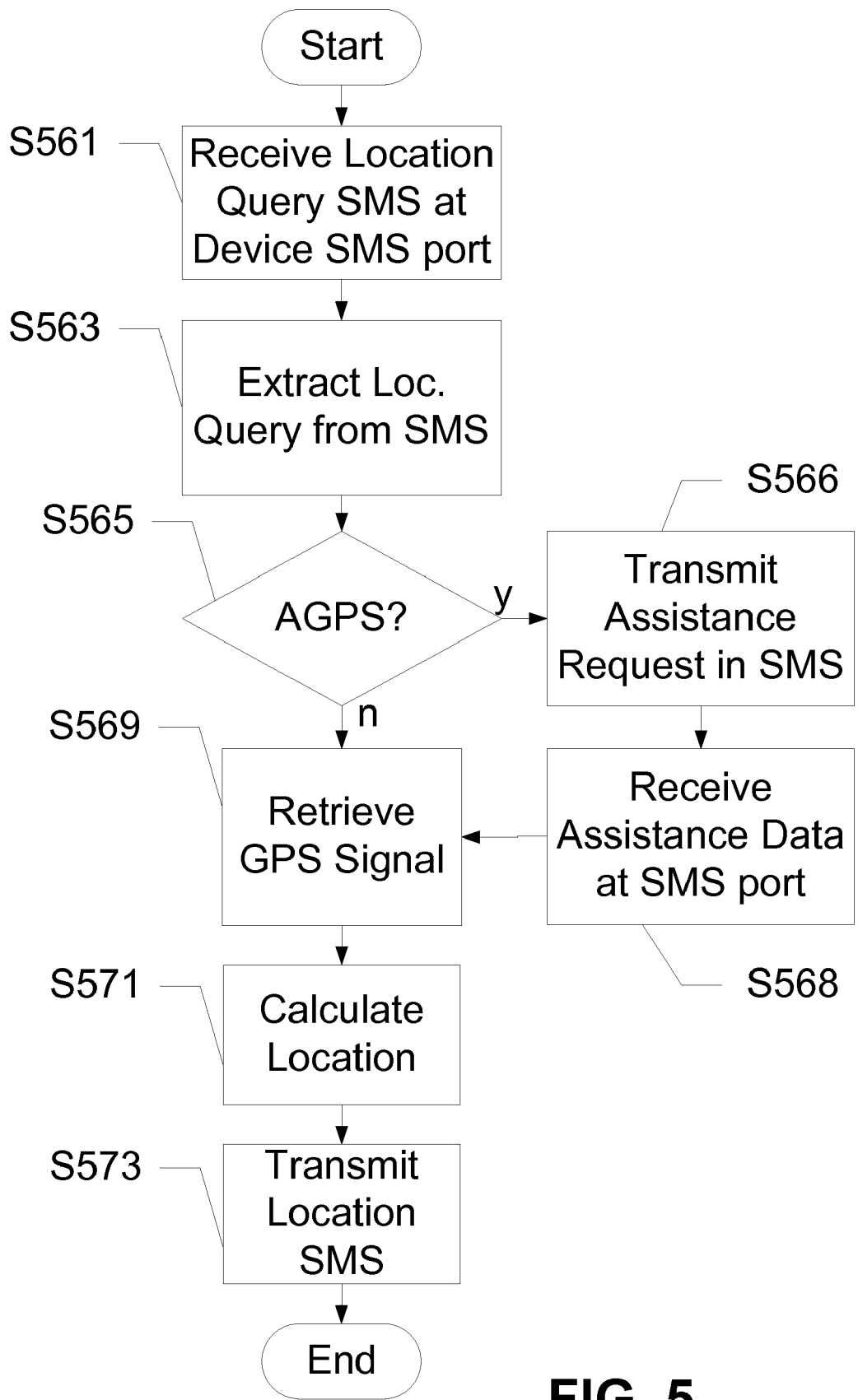
FIG. 5 shows a method for determining a location of a mobile communication device, according to an exemplary embodiment of the present invention.

FIG. 5 shows a method for determining a location of a mobile communication device, according to an exemplary embodiment of the present invention. A mobile communication device receives a location query in the form of an SMS message S561. Location logic on the mobile communication device "listens" for SMS messages targeted to a particular port, and is therefore aware that the SMS message contains a location query. The location query is extracted from the SMS message S563. At this point, the mobile communication device attempts to determine a location S565. An AGPS device will transmit an assistance request to the network via an assistance request SMS message S566. Upon receiving the assistance data, also in an SMS message targeted to the particular port S568, the mobile communication device attempts to communicate with GPS satellites S569. The attempt to communicate with GPS satellites S569 can also be performed by GPS devices that do not require assistance data. In either case, a location is calculated from received GPS signals S571. The location is embedded into a response SMS message, and transmitted back to the network S573.

The response SMS message containing the location can be addressed to the network element that generated the location query, or the location can be extracted and transmitted to a location server which forwards the location to the querying network element. Alternatively, authorization of the querying network element to receive the location is verified. Alternatively, a plurality of SMS messages can be exchanged between the mobile communication device and a location server, wherein the actual determination of location is performed on the network and forwarded to the querying network element. Alternatively, a prompt can be issued to a user of the mobile communication device when a location query SMS is received S563. The user responds to the prompt with an authorization or denial of the querying network element to receive the location of the mobile communication device.

Figure 6:
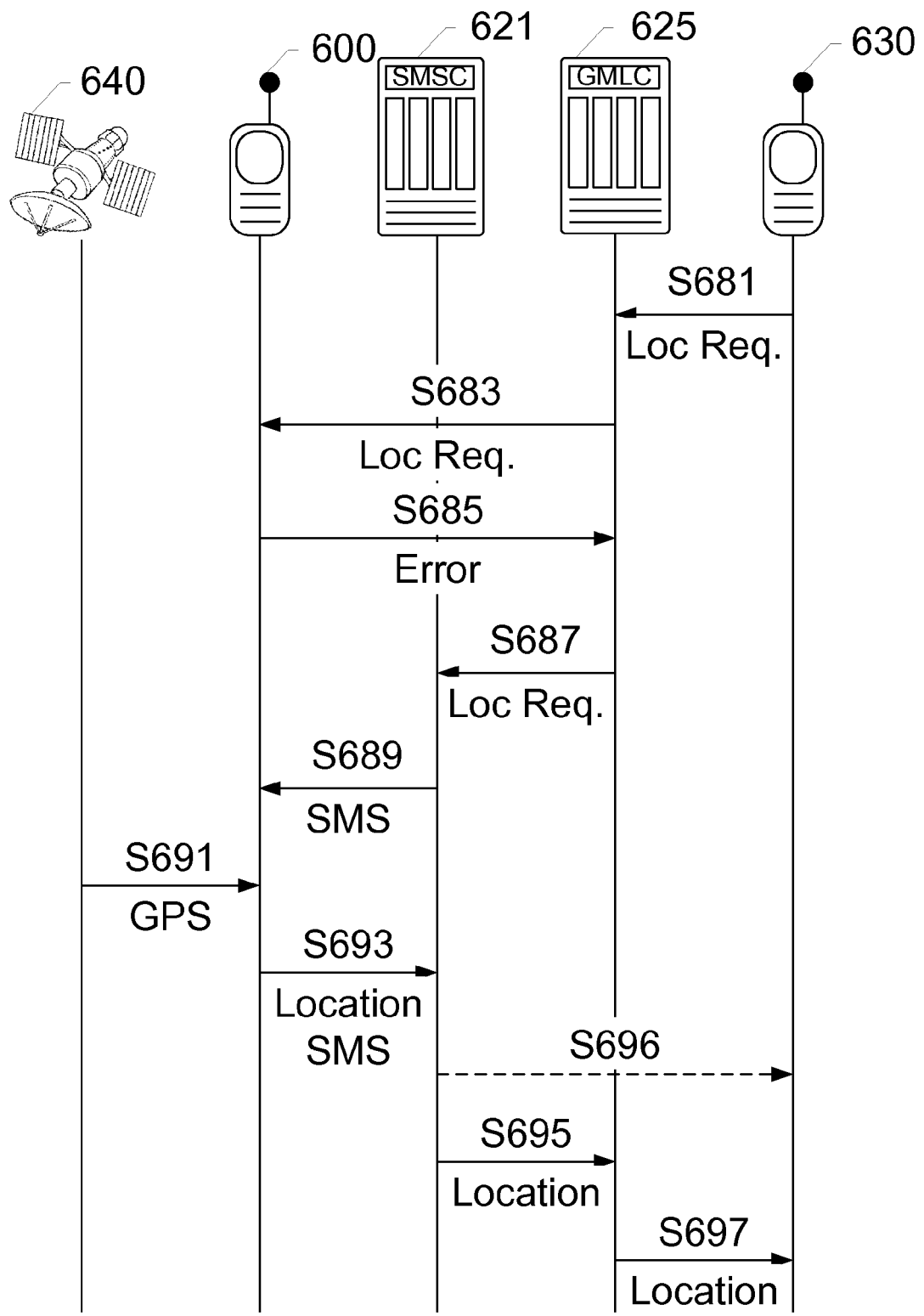
FIG. 6 shows an action diagram for invoking an SMS mechanism when a SUPL query fails, according to an exemplary embodiment of the present invention.

FIG. 6 shows an action diagram for invoking an SMS mechanism when a SUPL query fails, according to an exemplary embodiment of the present invention. S681: A third-party device 630 transmits a location request to a location server 625. S683: Location server 625 transmits the location query across the user plane to mobile communication device 600. However, query S683 fails, because mobile communication device 600 is unable to receive SUPL requests. S685: an error code is returned, either from mobile communication device 600, or a network element traversed en route to location server 625. S687: In response to the error code, location server 625 transmits the location request to an SMSC 621. Location server 625 may further store the error code in a local database, thereby ensuring that future location queries for mobile communication device 600 will be sent via the SMSC 621. S689: SMSC 621 generates an SMS location query and transmits it to a specified port on mobile communication device 600. S691: Upon receiving the SMS location query, mobile communication device 600 receives GPS signals from satellite 640. S693: Mobile communication device 600 calculates its own location, and transmits the location back to SMSC 621 via an SMS message. The SMS message can be addressed to device 630, in which case SMSC 621 directly transmits the SMS location to device 630 (S696). S695: Alternatively, SMSC extracts the location and forwards it to location server 625. S697: Location server 625 then transmits the location to third-party device 630 that requested the location.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For instance, according to embodiments of the present invention, a mobile communication device may be located in Europe and use this information to decide to use the Galileo satellites rather than GPS. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A mobile communication device, comprising:
a processor;
a memory in communication with the processor;
a transceiver in communication with the processor;
a GPS receiver in communication with the processor; and
a location logic on the memory, wherein the location logic is executed by the processor to perform operations including:
receiving a first short message service (SMS) message from a network via the transceiver,
extracting a location query from the first SMS message,
receiving assistance data from the network via a second SMS message,
retrieving a GPS signal from a GPS satellite based on the assistance data,
calculating a location for the mobile communication device, and
transmitting the location to the network via a third SMS message.

2. The device of claim 1, wherein the first SMS message is received from an SMS center in communication with a Location Server on the network, based upon a determination that the mobile communication device is unable to receive a user plane location query.

3. The device of claim 1, wherein the location logic is executed by the processor to address the second SMS message to a network element that generated the location query.

4. The device of claim 1, wherein the location logic is executed by the processor to designate an SMS port for receiving the first SMS message having the location query.

5. The device of claim 1, wherein the location logic is further executed by the processor to transmit an assistance query to the network via a fourth SMS message.

6. The device of claim 5, wherein the assistance query includes at least one of a time of day, a Mobile Network Code (MNC), a Mobile Country Code (MNC), a Location Area Code (LAC), and a Cell ID.

7. The device of claim 5, wherein the assistance data includes at least one of a base transceiver station coordinate set, and GPS ephemeris data.

8. A system, comprising:
a mobile communication device having a GPS receiver; and
a location logic on the mobile communication device that, when executed by a processor on the mobile communication device, enables the processor to perform operations including:
receiving a first SMS message from a SMS center at a specified SMS port on the mobile communication device, the SMS center being in communication with the mobile communication device across a network,
extracting a location query from the first SMS message,
receiving assistance data from a location server via a second SMS message, the location server being in communication with the SMS center,
retrieving a GPS signal from the GPS satellite based on the assistance data,
calculating a location for the mobile communication device, and
transmitting the location to the network via a third SMS message.

9. The system of claim 8, further comprising:
a network element that generates the location query and transmits the location query to the location server; and
a server logic on the location server that is executed by the location server to perform operations including receiving the location query, determining that the mobile communication device is unable to receive a user-plane location query, and forwarding the location query to the SMS center.

10. The system of claim 9, further comprising SMS logic on the SMS center that is executed by the SMS center to perform operations including:
receiving the third SMS message from the mobile communication device,
extracting the location from the third SMS message, and transmitting the location to the location server,
wherein the server logic forwards the location to the network element.

11. The system of claim 9, further comprising SMS logic on the SMS center that is executed by the SMS center to perform operations including:
receiving the third SMS message from the mobile communication device, and
forwarding the third SMS message to the network element.

12. The system of claim 8, wherein the location logic is further executed by the processor to perform operations including transmitting an assistance query to the network via a fourth SMS message.

13. The system of claim 12, wherein the assistance query includes at least one of a time of day, a Mobile Network Code (MNC), a Mobile Country Code (MNC), a Location Area Code (LAC), and a Cell ID.

14. The system of claim 12, wherein the assistance data includes at least one of a base transceiver station coordinate set, and GPS ephemeris data.

15. A method, comprising:
utilizing a mobile device including at least a processor and a location logic that is executed by the processor for receiving a first Short Message Service (SMS) message from a network;
utilizing the processor for extracting a location query from the first SMS message, the location query being generated by a third-party network element;
utilizing the processor for receiving assistance data from a location server via a second SMS message,
utilizing the processor for retrieving a GPS signal from a GPS satellite based on the assistance data;
utilizing the processor for calculating a location for the mobile communication device; and
utilizing the processor for transmitting the location to the network via a third SMS message.

16. The method of claim 15, further comprising:
determining that the mobile communication device is unable to receive a User Plane Location Query.

17. The method of claim 15, further comprising:
addressing the third SMS message to the third-party network element that generated the location query.

18. The method of claim 15, further comprising designating an SMS port on the mobile communication device for receiving the first SMS message having the location query.

19. The method of claim 15, further comprising transmitting an assistance query to the network via a fourth SMS message.

20. The method of claim 15, wherein the assistance query includes at least one of a time of day, an MNC, an MCC, an LAC, and a Cell ID; and wherein the assistance data includes at least one of a base transceiver station coordinate set, and GPS ephemeris data.

* * * * *